United States Patent
Vaid et al.

(10) Patent No.: US 11,833,979 B2
(45) Date of Patent: Dec. 5, 2023

(54) MULTI-CAMERA VEHICLE VISION SYSTEM WITH DATA SYNCHRONIZATION

(71) Applicant: Magna Electronics Inc., Auburn Hills, MI (US)

(72) Inventors: Vivek Vaid, South Lyon, MI (US); Yuesheng Lu, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 18/152,958

(22) Filed: Jan. 11, 2023

(65) Prior Publication Data

US 2023/0158971 A1     May 25, 2023

Related U.S. Application Data

(63) Continuation of application No. 16/177,556, filed on Nov. 1, 2018, now Pat. No. 11,554,727.

(Continued)

(51) Int. Cl.
| | |
|---|---|
| *B60R 11/04* | (2006.01) |
| *B60R 1/00* | (2022.01) |
| *H04N 7/18* | (2006.01) |
| *H04N 9/64* | (2023.01) |
| *B60W 30/00* | (2006.01) |
| *H04N 23/60* | (2023.01) |

(Continued)

(52) U.S. Cl.
CPC ............. *B60R 11/04* (2013.01); *B60R 1/00* (2013.01); *B60W 30/00* (2013.01); *H04N 7/181* (2013.01); *H04N 9/64* (2013.01); *H04N 23/60* (2023.01); *H04N 23/66* (2023.01); *H04N 23/72* (2023.01); *B60R 2300/105* (2013.01); *B60R 2300/402* (2013.01); *H04N 23/88* (2023.01)

(58) Field of Classification Search
CPC ..... B60R 11/04; B60R 1/00; B60R 2300/105; B60R 2300/402; H04N 23/66; H04N 23/72; H04N 23/60; H04N 23/88; H04N 7/181; H04N 9/64; B60W 30/00
USPC ......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Allen C Wong
(74) *Attorney, Agent, or Firm* — HONIGMAN LLP

(57) ABSTRACT

A vehicular vision system includes a rearward-viewing camera and a forward-viewing camera disposed at a vehicle. Image data captured by the cameras is provided to the electronic control unit. The electronic control unit sends respective control data to the cameras, and the respective sent control data is stored in respective memory of the cameras. With the respective sent control data stored in the respective memory of the cameras, the electronic control unit sends a trigger signal to the cameras. Responsive to the sent trigger signal, the cameras load operational parameters of the respective stored control data into respective image sensors of the cameras so that the operational parameters of the respective image sensors of the cameras are synchronized. With the operational parameters of the respective image sensors of the cameras synchronized, image data is captured by the respective image sensors and is sent to the electronic control unit.

28 Claims, 3 Drawing Sheets

Related U.S. Application Data

(60) Provisional application No. 62/581,939, filed on Nov. 6, 2017.

(51) Int. Cl.
    *H04N 23/66*     (2023.01)
    *H04N 23/72*     (2023.01)
    *H04N 23/88*     (2023.01)

(56) References Cited

U.S. PATENT DOCUMENTS

| | | |
|---|---|---|
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,508,350 B2 | 8/2013 | Nix et al. |
| 9,508,014 B2 | 11/2016 | Lu et al. |
| 10,089,537 B2 | 10/2018 | Nix et al. |
| 11,554,727 B2 | 1/2023 | Vaid et al. |
| 2012/0257045 A1 | 10/2012 | Ockerse |
| 2013/0116859 A1 | 5/2013 | Ihlenburg et al. |
| 2013/0242145 A1* | 9/2013 | Zipnick .............. G06T 5/002 348/241 |
| 2014/0218535 A1 | 8/2014 | Ihlenburg et al. |
| 2014/0222280 A1* | 8/2014 | Salomonsson ... G08G 1/096766 701/1 |
| 2017/0078588 A1* | 3/2017 | Graf .................. B60R 1/00 |
| 2017/0223269 A1 | 8/2017 | Fluegel |
| 2017/0223306 A1 | 8/2017 | Lu et al. |
| 2017/0295352 A1 | 10/2017 | Ihlenburg et al. |
| 2018/0109755 A1 | 4/2018 | Vaid et al. |
| 2018/0188740 A1 | 7/2018 | May et al. |
| 2018/0365859 A1* | 12/2018 | Oba ............... H04N 23/90 |

\* cited by examiner

MULTI-CAMERA VEHICLE VISION SYSTEM WITH DATA SYNCHRONIZATION

CROSS REFERENCE TO RELATED APPLICATIONS

The present application is a continuation of U.S. patent application Ser. No. 16/177,556, filed Nov. 1, 2018, now U.S. Pat. No. 11,554,727, which claims the filing benefits of U.S. provisional application Ser. No. 62/581,939, filed Nov. 6, 2017, which is hereby incorporated herein by reference in its entirety.

FIELD OF THE INVENTION

The present invention relates generally to a vehicle vision system for a vehicle and, more particularly, to a vehicle vision system that utilizes a plurality of cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that utilizes a plurality of cameras to capture image data representative of images exterior of the vehicle, and provides for synchronization of the Auto White Balance (AWB) and Auto Exposure (AE) performance (and optionally other image quality features) of all the cameras simultaneously. The driving assistance system may comprise an autonomous vehicle control system that controls steering, braking and accelerating of the vehicle responsive at least in part to processing of image data captured by the cameras.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
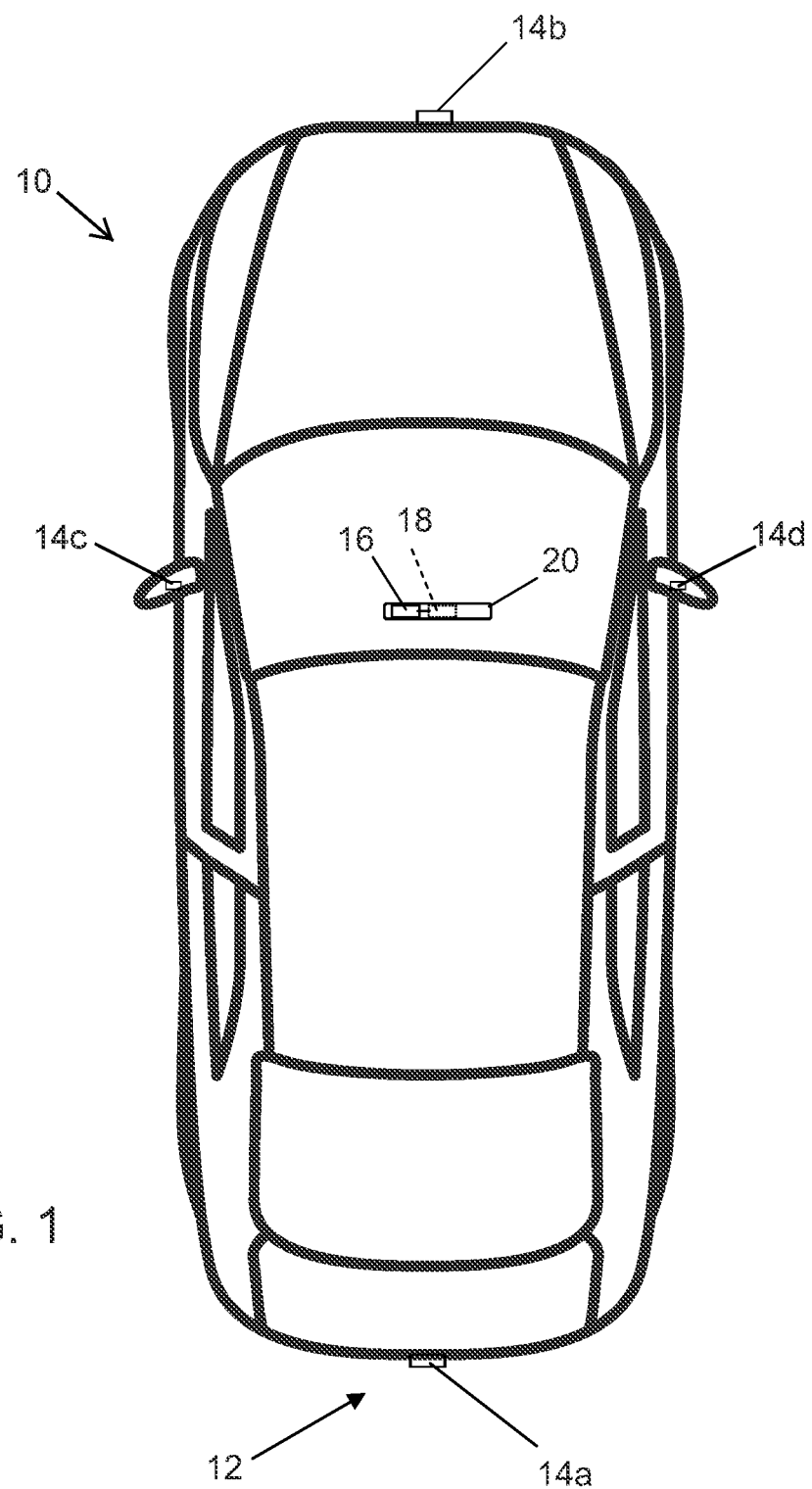
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
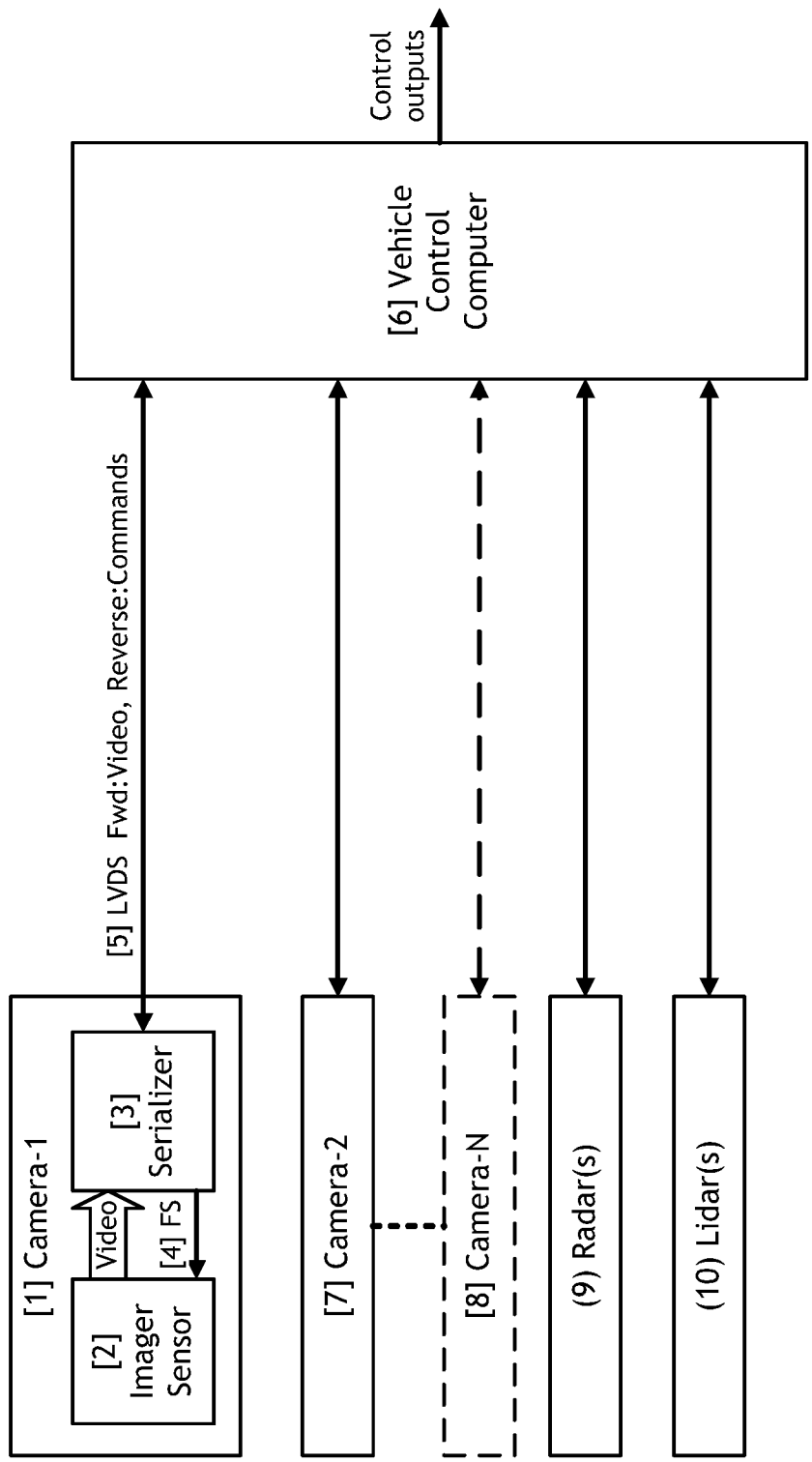
FIG. 2 is a block diagram of an autonomous vehicle control that uses a plurality of cameras, radar sensors and/or lidar sensors, which provide feeds to a vehicle control computer.

FIG. 2 shows a general implementation block diagram of multiple sensors connected to a central computer in an autonomous vehicle. The autonomous vehicle may have two to twelve cameras (or more) and multiple other sensors depending on the particular application. A common and basic requirement for most machine vision algorithms is the data from these multiple sensors, in particular cameras, should be synchronized in time.

FIG. 2 shows data and control flow for a Camera-1 [1] that is connected to a vehicle control computer 6 via a low voltage differential signaling (LVDS) bus 5. The LVDS bus 5 allows forward channel video and also carries backward (or back-channel) control commands to the camera. Multiple such cameras (up to Camera-N 8) may be connected in this manner. The video frames from these cameras are not synchronized until some external control is exercised. The common method to synchronize the individual video frames is using a Frame Sync pulse, indicated as FS 4, commanded from vehicle control computer 6. The vehicle control computer issues this pulse to all cameras simultaneously, and since it is connected to a general purpose input/output (GPIO) pin of the serializer 3, it reaches all cameras simultaneously (with sub-microsecond latency). The image sensor 2 issues a video frame start synchronous to the FS 4 pulse, and thus the vehicle control computer 6 receives video frames from all cameras starting at same time (with sub-microsecond latency).

This mechanism, however, does not synchronize the Auto White Balance (AWB) and Auto Exposure (AE) performance of all the cameras simultaneously because update of those features' performance requires download of multiple data register values from the vehicle control computer 6 to the image sensor 2 via a serial protocol (I2C or SPI) through the LVDS 5 backchannel. This serial download introduces a latency of tens to hundreds milliseconds. For example, if there are ten cameras in a vehicle, by the time Camera-10 receives its commands, Camera-1 will already be streaming video with new AWB and AE settings. A difference in AWB and AE settings, especially while the vehicle is moving from a sunny condition to a shaded condition, or driving into a tunnel, could yield drastically different images between the cameras and thus trigger false alarms in algorithms of the vehicle control computer 6.

An exemplary implementation or block diagram of multiple cameras and sensors in an ADAS or autonomous vehicle is shown in FIG. 2. The image sensor 2 captures image data representative of the environment, and the serializer 3 outputs the video from the camera 1 to the vehicle control computer 6. The serializer 3 also receives the backchannel control commands from the vehicle control computer 6 and transmits them to the image sensor 2 via a serial bus like I2C or SPI (which is not shown for clarity). The vehicle control computer 6 issues a Frame Synchronization pulse or FS pulse 4, which is usually connected to one the GPIO outputs of the serializer 3. Since this FS pulse 4 is a GPIO pulse and not a serial (I2C/SPI) command, it can be synchronous across multiple cameras (such as shown in FIGS. 1 and 2). All the cameras issue a simultaneous video frame-start at the arrival of FS pulse 4. This mechanism achieves effective frame synchronization between cameras with sub-microsecond latency, which is sufficient for camera operating at 30 FPS (33 ms) or 60 FPS frame rates.

However, if the vehicle control computer 6 send commands to change the AWB, AE and other image-quality change control register data, it takes tens to hundreds of ms to load all the register data serially into the image sensor 2. Thus, this design does not synchronize fast enough the image quality and AWB, AE characteristic performance changes between multiple cameras. This may create confusion for the algorithms operating in the vehicle control computer.

The present invention provides a solution to synchronize the AWB, AE and other image quality features, which require bulk transfer of control register data.

Figure 3:
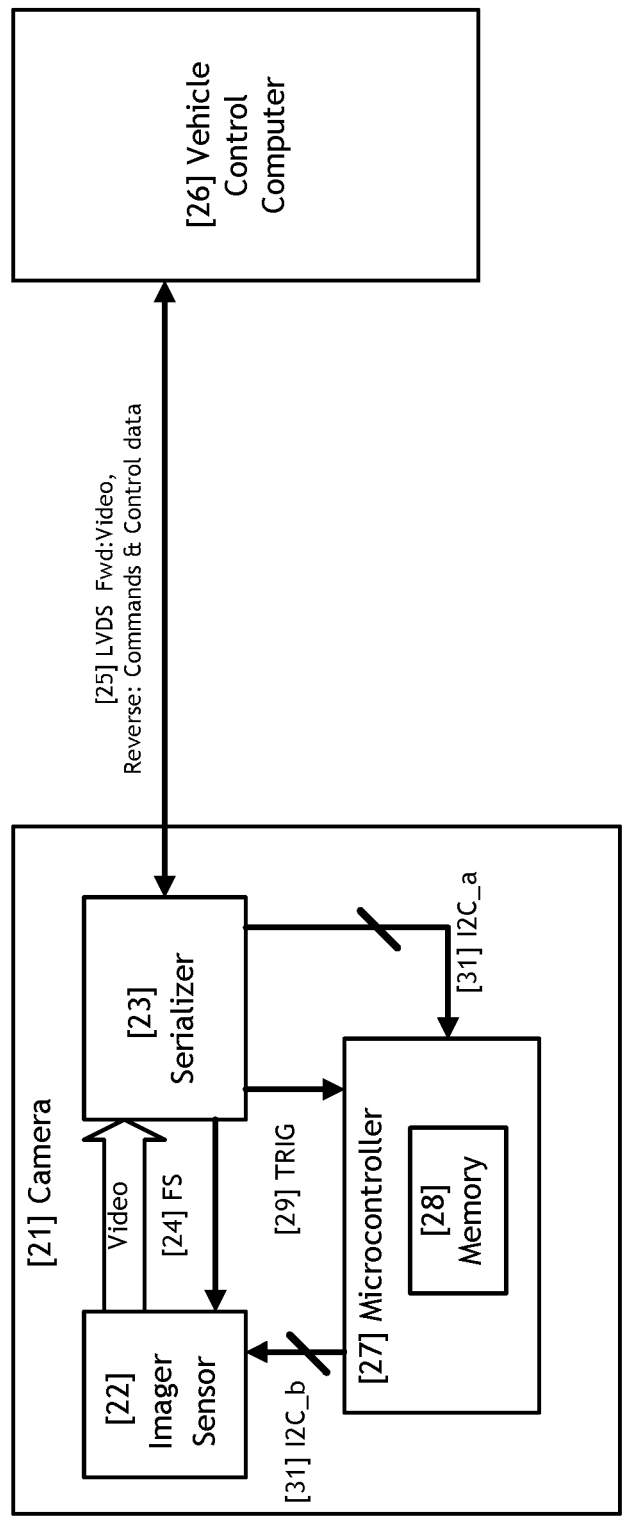
FIG. 3 is a block diagram showing a system that synchronizes AWB, AE and image-quality features of the plurality of cameras in accordance with the present invention.

FIG. 3 shows an embodiment or block diagram of a camera and the vision system, where the camera can be synchronized even for bulk control data changes for AWB, AE and image-quality features. The image sensor 22 of the camera 21 captures image data representative of the environment and the serializer 23 outputs the video from the camera 21 to the vehicle control computer 6. The serializer 23 also receives the backchannel control commands from the vehicle control computer 26 and transmits them to the microcontroller 28 via a serial bus I2C_a 31. The vehicle control computer 26 issues a Frame Synchronization pulse FS 24, which is connected to a GPIO output of the serializer 23.

When the vehicle control computer 26 send commands to change the AWB, AE and other image-quality change control register data, all this bulk data is loaded into staging memory 28. Once all the data has been pre-loaded into staging memory for all the cameras which require synchronization, the vehicle control computer issues a trigger pulse (TRIG) 29. The trigger pulse 29 is also connected to a GPIO pin, and thus can be synchronous across multiple cameras. At the arrival of the trigger pulse 29 at each camera, the microcontroller 27 loads the image sensor 22 of that camera (via I2C_b 31) with the bulk control data or operational parameters that were previously stored in local memory 28 and that are associated with the received trigger pulse. Thus, the trigger pulse or signal 29 acts as a gating signal for bulk loads from local memory 28 into the image sensor 22. The trigger pulse comprises a simple signal or pulse and can be simultaneously communicated to each of the plurality of cameras, whereby each camera, upon receipt of the trigger pulse or signal, can readily and efficiently load the image sensor with the AWB and AE parameters associated with the received trigger pulse or signal. This mechanism achieves synchronization across cameras of AE/AWB and image-quality features or operational parameters which require bulk register transfers to the imager.

Optionally, the memory 28 may be external to the microcontroller 27, such as external RAM or Flash or the like. Optionally, there may be multiple trigger pulses or signals, such as, for example, TRIG(1), TRIG(2), . . . TRIG(n), per the GPIO limits of the serializer chosen. The multiple trigger pulses or signals could allow gating to multiple AE, AWB or image-quality register settings or parameters already staged in the memory 28. For example, a first trigger pulse or signal may result in all cameras loading a first set of operational parameters or settings (such as for AE and AWB), with the first triggers being communicated responsive to a determined driving condition, such as a lighting condition or the like, at the vehicle. When a different driving or lighting condition is determined, a second trigger pulse or signal may be communicated, whereby all of the cameras load a second set of operational parameters or settings (such as for AE and AWB) for that newly determined driving or lighting condition. Optionally, instead of I2C buses, either bus could be SPI or the like, depending on the system architecture.

Thus, the present invention provides a system that uses a plurality of cameras that receive commands and control data from a control computer at a serializer of each camera, with each camera also having a microcontroller and memory. The serializer transmits the data received from the control computer to the microcontroller. The commands to change AWB, AE and/or other image quality data are stored in staging memory of the microcontroller of the cameras, and once all of that data is pre-loaded into the staging memory of all of the cameras, the control computer can generate a trigger, which is synchronous across the multiple cameras, such that the microcontroller of each camera, responsive to the trigger or pulse, loads the image sensor of that camera with the control data or settings or parameters stored in local memory so that the cameras are synchronized.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat.

Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a rearward-viewing camera disposed at a vehicle equipped with the vehicular vision system, wherein the rearward-viewing camera views at least rearward of the equipped vehicle;

wherein the rearward-viewing camera comprises an image sensor having at least one million photosensing elements arranged in rows and columns;

wherein image data captured by the rearward-viewing camera is provided to an electronic control unit;

a forward-viewing camera disposed at the equipped vehicle, wherein the forward-viewing camera views at least forward of the equipped vehicle;

wherein the forward-viewing camera comprises an image sensor having at least one million photosensing elements arranged in rows and columns;

wherein image data captured by the forward-viewing camera is provided to the electronic control unit;

wherein the electronic control unit sends respective control data to the rearward-viewing camera and to the forward-viewing camera, and wherein the respective sent control data is stored in respective memory of the rearward-viewing camera and the forward-viewing camera;

wherein, with the respective sent control data stored in the respective memory of the rearward-viewing camera and the forward-viewing camera, the electronic control unit sends a trigger signal to the rearward-viewing camera and to the forward-viewing camera;

wherein, responsive to the sent trigger signal, the rearward-viewing camera and the forward-viewing camera load operational parameters of the respective control data stored in the respective memory of the rearward-viewing camera and the forward-viewing camera into respective image sensors of the rearward-viewing camera and the forward-viewing camera so that the operational parameters of the respective image sensors of the rearward-viewing camera and the forward-viewing camera are synchronized; and wherein, with the operational parameters of the respective image sensors of the rearward-viewing camera and the forward-viewing camera synchronized, image data is captured by the respective image sensors of the rearward-viewing camera and the forward-viewing camera and is sent to the electronic control unit.

2. The vehicular vision system of claim 1, wherein the electronic control unit sends respective control data to respective serializers of the rearward-viewing camera and the forward-viewing camera.

3. The vehicular vision system of claim 1, wherein the electronic control unit sends respective control data to the rearward-viewing camera and the forward-viewing camera via low voltage differential signaling.

4. The vehicular vision system of claim 1, wherein the rearward-viewing camera and the forward-viewing camera send respective captured image data to the electronic control unit via low voltage differential signaling.

5. The vehicular vision system of claim 1, wherein the control data comprises auto white balance parameters and auto exposure parameters.

6. The vehicular vision system of claim 5, wherein the electronic control unit sends auto white balance parameters and auto exposure parameters to the rearward-viewing camera and to the forward-viewing camera, and wherein the sent parameters are stored in the respective memory of the rearward-viewing camera and the forward-viewing camera.

7. The vehicular vision system of claim 6, wherein, after the parameters are sent to the rearward-viewing camera and the forward-viewing camera and stored in the respective memory of the rearward-viewing camera and the forward-viewing camera, the electronic control unit sends one of a plurality of trigger signals to the rearward-viewing camera and to the forward-viewing camera, and wherein each trigger signal of the plurality of trigger signals is associated with a respective set of parameters.

8. The vehicular vision system of claim 7, wherein, responsive to the sent trigger signal, the rearward-viewing camera and the forward-viewing camera load the respective parameters for the sent trigger signal into the respective image sensors of the rearward-viewing camera and the forward-viewing camera.

9. The vehicular vision system of claim 1, wherein image data captured by the image sensor of at least the rearward-viewing camera is processed at the electronic control unit for object detection.

10. The vehicular vision system of claim 1, wherein the electronic control unit generates an output based on the sent captured image data.

11. The vehicular vision system of claim 10, comprising a display device that displays video images derived from the output of the electronic control unit.

12. A vehicular vision system, the vehicular vision system comprising:

a rearward-viewing camera disposed at a vehicle equipped with the vehicular vision system, wherein the rearward-viewing camera views at least rearward of the equipped vehicle;

wherein the rearward-viewing camera comprises an image sensor having at least one million photosensing elements arranged in rows and columns;

wherein image data captured by the rearward-viewing camera is provided to an electronic control unit;

a forward-viewing camera disposed at a windshield of the equipped vehicle, wherein the forward-viewing camera views at least forward of the equipped vehicle through the windshield;

wherein the forward-viewing camera comprises an image sensor having at least one million photosensing elements arranged in rows and columns;

wherein image data captured by the forward-viewing camera is provided to the electronic control unit;

wherein the electronic control unit sends respective control data to the rearward-viewing camera and to the forward-viewing camera, and wherein the respective sent control data is stored in respective memory of the rearward-viewing camera and the forward-viewing camera;

wherein the control data comprises at least auto white balance and auto exposure parameters;

wherein, with the respective sent control data stored in the respective memory of the rearward-viewing camera and the forward-viewing camera, the electronic control unit sends a trigger signal to the rearward-viewing camera and to the forward-viewing camera;

wherein, responsive to the sent trigger signal, the rearward-viewing camera and the forward-viewing camera load operational parameters of the respective control data stored in the respective memory of the rearward-viewing camera and the forward-viewing camera into respective image sensors of the rearward-viewing camera and the forward-viewing camera so that the operational parameters of the respective image sensors of the rearward-viewing camera and the forward-viewing camera are synchronized; and wherein, with the operational parameters of the respective image sensors of the rearward-viewing camera and the forward-viewing camera synchronized, image data is captured by the respective image sensors of the rearward-viewing camera and the forward-viewing camera and is sent to the electronic control unit.

13. The vehicular vision system of claim 12, wherein the electronic control unit sends respective control data to respective serializers of the rearward-viewing camera and the forward-viewing camera.

14. The vehicular vision system of claim 12, wherein the electronic control unit sends respective control data to the rearward-viewing camera and the forward-viewing camera via low voltage differential signaling.

15. The vehicular vision system of claim 12, wherein the rearward-viewing camera and the forward-viewing camera send respective captured image data to the electronic control unit via low voltage differential signaling.

16. The vehicular vision system of claim 12, wherein the sent auto white balance parameters and auto exposure parameters are stored in the respective memory of the rearward-viewing camera and the forward-viewing camera.

17. The vehicular vision system of claim 16, wherein, after the parameters are sent to the rearward-viewing camera and the forward-viewing camera and stored in the respective memory of the rearward-viewing camera and the forward-viewing camera, the electronic control unit sends one of a plurality of trigger signals to the rearward-viewing camera and to the forward-viewing camera, and wherein each trigger signal of the plurality of trigger signals is associated with a respective set of parameters.

18. The vehicular vision system of claim 17, wherein, responsive to the sent trigger signal, the rearward-viewing camera and the forward-viewing camera load the respective parameters for the sent trigger signal into the respective image sensors of the rearward-viewing camera and the forward-viewing camera.

19. The vehicular vision system of claim 12, wherein image data captured by the image sensor of at least the rearward-viewing camera is processed at the electronic control unit for object detection.

20. The vehicular vision system of claim 12, wherein the electronic control unit generates an output based on the sent captured image data, and wherein a display device of the equipped vehicle displays video images derived from the output of the electronic control unit.

21. A vehicular vision system, the vehicular vision system comprising:
a rearward-viewing camera disposed at a vehicle equipped with the vehicular vision system, wherein the rearward-viewing camera views at least rearward of the equipped vehicle;
wherein the rearward-viewing camera comprises an image sensor having at least one million photosensing elements arranged in rows and columns;
wherein image data captured by the rearward-viewing camera is provided to an electronic control unit;
wherein image data captured by the image sensor of the rearward-viewing camera is processed at the electronic control unit for object detection;
a forward-viewing camera disposed at a front portion of the equipped vehicle, wherein the forward-viewing camera views at least forward of the equipped vehicle;
wherein the forward-viewing camera comprises an image sensor having at least one million photosensing elements arranged in rows and columns;
wherein image data captured by the forward-viewing camera is provided to the electronic control unit;
wherein image data captured by the image sensor of the forward-viewing camera is processed at the electronic control unit for object detection;
wherein the electronic control unit sends respective control data to the rearward-viewing camera and to the forward-viewing camera, and wherein the respective sent control data is stored in respective memory of the rearward-viewing camera and the forward-viewing camera;
wherein, with the respective sent control data stored in the respective memory of the rearward-viewing camera and the forward-viewing camera, the electronic control unit sends a trigger signal to the rearward-viewing camera and to the forward-viewing camera;
wherein, responsive to the sent trigger signal, the rearward-viewing camera and the forward-viewing camera load operational parameters of the respective control data stored in the respective memory of the rearward-viewing camera and the forward-viewing camera into respective image sensors of the rearward-viewing camera and the forward-viewing camera so that the operational parameters of the respective image sensors of the rearward-viewing camera and the forward-viewing camera are synchronized; and
wherein, with the operational parameters of the respective image sensors of the rearward-viewing camera and the forward-viewing camera synchronized, image data is captured by the respective image sensors of the rearward-viewing camera and the forward-viewing camera and is sent to the electronic control unit.

22. The vehicular vision system of claim 21, wherein the electronic control unit sends respective control data to respective serializers of the rearward-viewing camera and the forward-viewing camera.

23. The vehicular vision system of claim 21, wherein the electronic control unit sends respective control data to the rearward-viewing camera and the forward-viewing camera via low voltage differential signaling.

24. The vehicular vision system of claim 21, wherein the rearward-viewing camera and the forward-viewing camera send respective captured image data to the electronic control unit via low voltage differential signaling.

25. The vehicular vision system of claim 21, wherein the control data comprises at least auto white balance parameters and auto exposure parameters, and wherein the electronic control unit sends auto white balance parameters and auto exposure parameters to the rearward-viewing camera and to the forward-viewing camera, and wherein the sent parameters are stored in the respective memory of the rearward-viewing camera and the forward-viewing camera.

26. The vehicular vision system of claim 25, wherein, after the parameters are sent to the rearward-viewing camera and the forward-viewing camera and stored in the respective memory of the rearward-viewing camera and the forward-viewing camera, the electronic control unit sends one of a plurality of trigger signals to the rearward-viewing camera and to the forward-viewing camera, and wherein each trigger signal of the plurality of trigger signals is associated with a respective set of parameters.

27. The vehicular vision system of claim 26, wherein, responsive to the sent trigger signal, the rearward-viewing camera and the forward-viewing camera load the respective parameters for the sent trigger signal into the respective image sensors of the rearward-viewing camera and the forward-viewing camera.

28. The vehicular vision system of claim 21, wherein the electronic control unit generates an output based on the sent captured image data, and wherein a display device of the equipped vehicle displays video images derived from the output of the electronic control unit.

* * * * *